US012098521B2

(12) United States Patent
Tevis et al.

(10) Patent No.: US 12,098,521 B2
(45) Date of Patent: Sep. 24, 2024

(54) CONTROL SYSTEM FOR A WORK MACHINE

(71) Applicant: Caterpillar Inc., Peoria, IL (US)

(72) Inventors: Ethan Tevis, Bloomington, IL (US); Michael C. Gentle, Maroa, IL (US)

(73) Assignee: Caterpillar Inc., Peoria, IL (US)

( * ) Notice: Subject to any disclaimer, the term of this patent is extended or adjusted under 35 U.S.C. 154(b) by 120 days.

(21) Appl. No.: 17/662,671

(22) Filed: May 10, 2022

(65) Prior Publication Data

US 2022/0259824 A1 Aug. 18, 2022

Related U.S. Application Data

(63) Continuation of application No. 16/298,423, filed on Mar. 11, 2019, now Pat. No. 11,396,736.

(51) Int. Cl.
| | |
|---|---|
| *E02F 9/20* | (2006.01) |
| *B62D 6/00* | (2006.01) |
| *B62D 9/04* | (2006.01) |
| *B62D 12/00* | (2006.01) |
| *E02F 3/84* | (2006.01) |
| *E02F 9/08* | (2006.01) |

(52) U.S. Cl.
CPC ............ *E02F 9/2087* (2013.01); *B62D 6/003* (2013.01); *B62D 9/04* (2013.01); *E02F 3/841* (2013.01); *B62D 12/00* (2013.01); *E02F 9/0841* (2013.01)

(58) Field of Classification Search
None
See application file for complete search history.

(56) References Cited

U.S. PATENT DOCUMENTS

| | | | |
|---|---|---|---|
| 7,178,623 B2 | 2/2007 | Ginzel | |
| 7,412,315 B2 | 8/2008 | Wildey | |
| 7,497,298 B2 | 3/2009 | Shearer | |
| 8,903,568 B1 | 12/2014 | Wang | |
| 9,217,238 B2 | 12/2015 | Sharma | |
| 9,227,478 B2 | 1/2016 | Horstman | |
| 9,234,331 B1 | 1/2016 | Sharma | |
| 9,624,648 B2 | 4/2017 | Arimatsu | |
| 9,777,461 B2 | 10/2017 | Wuisan | |

(Continued)

FOREIGN PATENT DOCUMENTS

| | | |
|---|---|---|
| CN | 202368639 U | 8/2012 |
| CN | 104723822 | 6/2015 |

(Continued)

OTHER PUBLICATIONS

English Translation for CN-105460122-A (Year: 2016).*

(Continued)

*Primary Examiner* — Thomas E Worden

(57) ABSTRACT

A control system is disclosed. The control system may include a first input component to control a lean angle of at least one set of wheels of a machine and to provide a visual and/or tactile indication of the lean angle. The control system may include a second input component to control an articulation angle of an articulated joint of the machine and to provide a visual and/or tactile indication of the articulation angle. The control system may include a third input component to control a rotation angle of an implement of the machine and to provide a visual and/or tactile indication of the rotation angle.

20 Claims, 5 Drawing Sheets

(56) References Cited

U.S. PATENT DOCUMENTS

| | | |
|---|---|---|
| 2003/0183438 A1 | 10/2003 | Higashi |
| 2005/0228281 A1 | 10/2005 | Nefos |
| 2009/0100599 A1 | 4/2009 | Rawls-Meehan |
| 2010/0231421 A1 | 9/2010 | Rawls-Meehan |
| 2012/0138067 A1 | 6/2012 | Rawls-Meehan |
| 2013/0289770 A1 | 10/2013 | Rawls-Meehan |
| 2016/0002885 A1 | 1/2016 | Sharma |
| 2016/0120740 A1 | 5/2016 | Rawls-Meehan |
| 2017/0112716 A1 | 4/2017 | Rawls-Meehan |
| 2017/0114524 A1* | 4/2017 | Wuisan ................ E02F 9/2004 |
| 2020/0094853 A1* | 3/2020 | Tate ...................... B60W 50/16 |

FOREIGN PATENT DOCUMENTS

| | | | | |
|---|---|---|---|---|
| CN | 105460122 A | * | 4/2016 | ............ A61B 5/221 |
| CN | 106609529 | | 5/2017 | |
| CN | 106609530 | | 5/2017 | |
| CN | 109109789 A | * | 1/2019 | |
| JP | 2017114155 A | * | 6/2017 | ............... B60Q 3/00 |

OTHER PUBLICATIONS

English Translation for CN-109109789-A (Year: 2019).*
English Translation for JP-2017114155-A (Year: 2017).*
Search Report for Int'l. Patent Appln. No. 2020101241960, mailed Sep. 14, 2022 (3 pgs).

\* cited by examiner

CONTROL SYSTEM FOR A WORK MACHINE

RELATED APPLICATIONS

This application is a continuation of and claims the benefit of priority to U.S. Nonprovisional patent application Ser. No. 16/298,423, filed on Mar. 11, 2019, the entirety of which is incorporated herein by reference.

TECHNICAL FIELD

The present disclosure is directed to a control system for a work machine and, more particularly, to a control system that provides provide a visual and/or tactile indication of a displacement of an angle associated with a work element of the work machine.

BACKGROUND

A work machine such as, a motor grader, a backhoe loader, an agricultural tractor, a wheel loader, a skid-steer loader, and/or other heavy equipment, is used for a variety of tasks requiring operator control of the work machine and various work implements associated with the work machine. The work machine and the work implements can be complicated and difficult to operate. For example, a work machine may have an operator interface with numerous controls concerning a position, an orientation, a depth, a width, and/or an angle of a work implement. The operator may engage a control, such as a lever, a button, and/or the like to cause the work element to move, rotate, articulate, and/or the like to a desired position and/or orientation. However, the operator must continuously engage the control to cause the element to move, rotate, articulate, and/or the like until the element reaches the desired position and/or orientation. Further, after the operator disengages the control, the control does not provide any indication of the position and/or orientation of the element. The operator may determine the position and/or orientation of the element by visual observation of the element and/or of other displays, gauges, and/or the like, but this causes the operator to divert attention away from the controls when operating the control, which may result in inefficient operation of the work machine (e.g., the operator may not notice that the element has moved past a desired position and/or orientation and must reengage the controls to move the element back to the desired position and/or orientation).

One attempt to facilitate an operator controlling a wheel-lean angle of leanable wheels of a work machine is disclosed in U.S. Pat. No. 9,227,478 that issued to Deere & Company on Jan. 5, 2016 ("the '478 patent"). In particular, the '478 patent discloses an operator inputting a wheel-lean angle setpoint into an advanced display unit using a menu/select button, an up button, and a down button to increment and decrement a setpoint value until a desired setpoint is displayed. Per the '478 patent, once the desired setpoint is entered, the operator may select the desired setpoint to be the wheel-lean angle setpoint by pressing the menu/select button. According to the '478 patent, the operator can engage a switch, which is not included in the advanced display unit, to cause the wheel-lean angle of the wheels to assume automatically the wheel-lean angle setpoint.

While the '478 patent provides an advanced display unit for an operator to set a wheel-lean angle before the operator engages a switch to cause the wheel-lean angle of the wheels to change, the operator still needs to divide the operator's attention between the advanced display unit and the switch. Further, per the '478 patent, the advanced display unit is used to display a number of screens, such as a rearview camera screen and/or an embedded cross slope system screen, in addition to a gauge screen that includes an articulation gauge. Accordingly, the advanced display unit only intermittently provides a visual indication of the wheel-lean angle of the wheels. Moreover, the advanced display unit and the switch do not provide any tactile indication to the operator related to the wheel-lean angle of the wheels.

The disclosed control system is directed towards overcoming one or more of the problems set forth above and/or other problems in the art.

SUMMARY

According to some implementations, the present disclosure is related to a motor grader. The motor grader may include a steerable traction device operatively connected to a first set of wheels and a driven traction device operatively connected to a second set of wheels. The motor grader may include a frame having an articulated joint for connecting the steerable traction device to the driven traction device and an implement operatively connected to the frame and having at least one axis of rotation. The motor grader may include a control system. The control system may include a first input component to control a lean angle of the first set of wheels, wherein the first input component is to provide a visual or tactile indication of the lean angle. The control system may include a second input component to control an articulation angle of the articulated joint, wherein the second input component is to provide a visual or tactile indication of the articulation angle. The control system may include a third input component to control a rotation angle of the implement, wherein the third input component is to provide a visual or tactile indication of the rotation angle.

According to some implementations, the present disclosure is related to a machine. The machine may include a first set of wheels; a second set of wheels; an articulated joint for connecting the first set of wheels and the second set of wheels via a frame; an implement operatively connected to the frame and having at least one axis of rotation; and a control system. The control system may include a first input component to control a lean angle of the first set of wheels and to provide a visual or tactile indication of the lean angle; a second input component to control an articulation angle of the articulated joint and to provide a visual or tactile indication of the articulation angle; or a third input component to control a rotation angle of the implement and to provide a visual or tactile indication of the rotation angle.

According to some implementations, the present disclosure is related to a control system. The control system may include a first input component to control a lean angle of at least one set of wheels of a machine, wherein the first input component is to provide a visual or tactile indication of the lean angle. The control system may include a second input component to control an articulation angle of an articulated joint that connects a first traction device of the machine to a second traction device of the machine, wherein the second input component is to provide a visual or tactile indication of the articulation angle. The control system may include a third input component to control a rotation angle of an implement of the machine, wherein the third input component is to provide a visual or tactile indication of the rotation angle.

DETAILED DESCRIPTION

Figure 1:
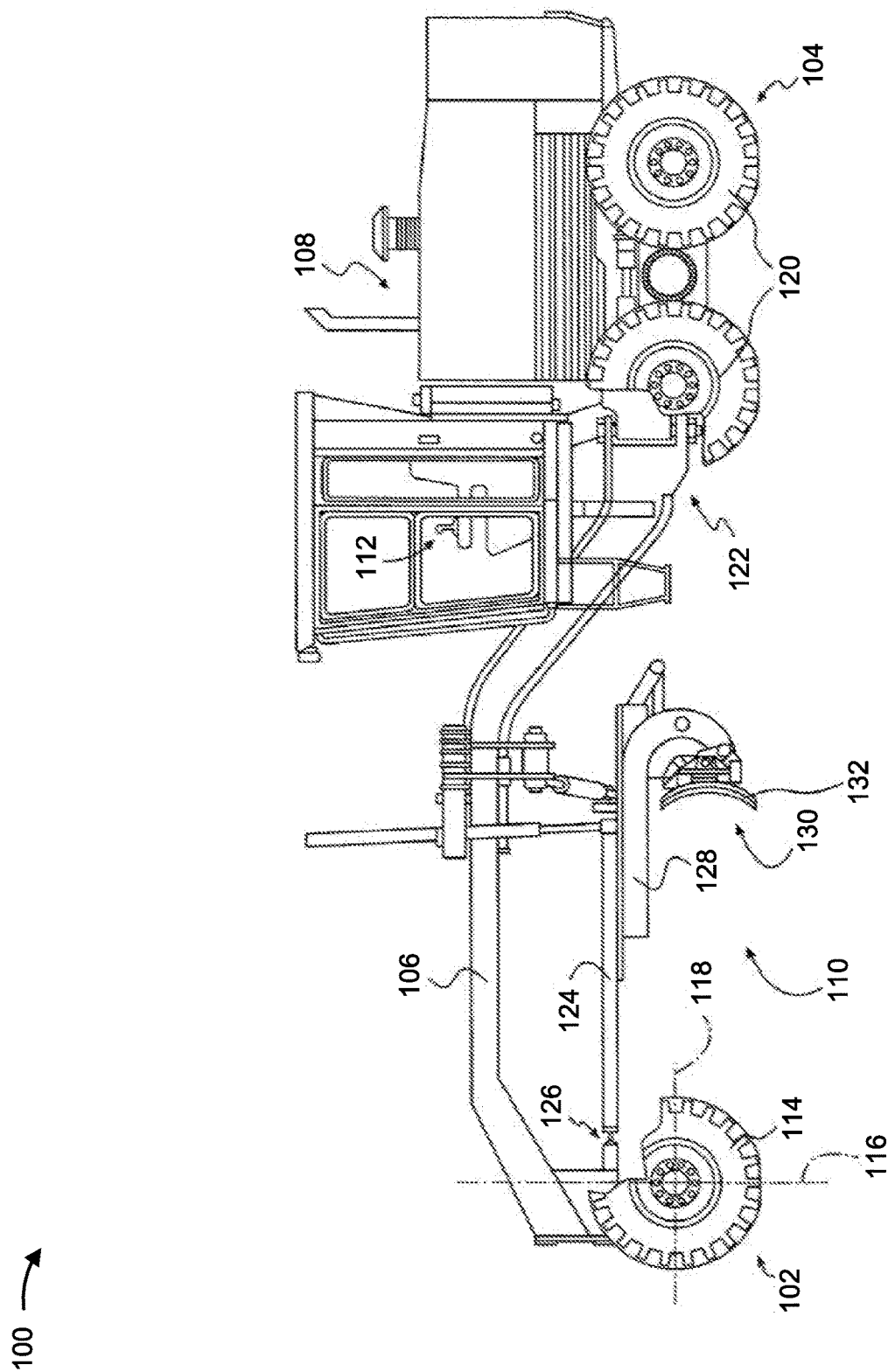
FIG. 1 is a diagram of an example work machine that includes a control system.

FIG. 1 is a diagram of an exemplary embodiment of a work machine 100 that includes a control system described herein. Work machine 100 may be a motor grader, a backhoe loader, an agricultural tractor, a wheel loader, a skid-steer loader, or any other type of work machine. Work machine 100 may include a steerable traction device 102, a driven traction device 104, a frame 106 connecting steerable traction device 102 to driven traction device 104, a power source 108 supported by driven traction device 104, and a transmission (not shown) configured to transmit power from power source 108 to driven traction device 104. Work machine 100 may also include a work implement such as, for example, a drawbar-circle-moldboard assembly (DCM) 110, and a control system 112. In some implementations, control system 112 may be a closed loop control system.

Steerable traction device 102 may include one or more wheels 114 located on each side of work machine 100 (only one side shown). Additionally, or alternatively, steerable traction device 102 may include tracks, belts, or other traction devices. Wheels 114 may be rotatable about a vertical axis 116 for use during steering. Control system 112 may cause wheels 114 to lean about a horizontal axis 118 to oppose a reaction force caused by DCM 110 engaging a work surface, or to adjust a height of DCM 110. Control system 112 may control a lean angle of wheels 114.

Driven traction device 104 may include wheels 120 located on each side of work machine 100 (only one side shown). Additionally, or alternatively, driven traction device 104 may include tracks, belts, or other traction devices. Frame 106 may connect steerable traction device 102 to driven traction device 104. Frame 106 may include an articulated joint 122 that connects driven traction device 104 to frame 106. Control system 112 may cause work machine 100 to articulate steerable traction device 102 relative to driven traction device 104 via articulated joint 122. Control system 112 may control an articulation angle of articulated joint 122.

Power source 108 may be an engine such as, for example, a diesel engine, a gasoline engine, a natural gas engine, or any other engine. Power source 108 may also be another source of power such as a fuel cell, a power storage device, or another source of power.

DCM 110 may include a drawbar assembly 124 supported by a center portion of frame 106 via a hydraulic ram assembly and connected to a front portion of frame 106 via a ball and socket joint 126. A circle assembly 128 may be connected to drawbar assembly 124 via additional hydraulic rams and may be configured to support a moldboard assembly 130 having a blade 132. DCM 110 may be both vertically and horizontally positioned relative to frame 106. Control system 112 may cause DCM 110 to rotate circle assembly 128 and moldboard assembly 130 relative to drawbar assembly 124 (e.g., around an axis of rotation). Control system 112 may control a rotation angle associated with DCM 110, drawbar assembly 124, circle assembly 128, and/or moldboard assembly 130. Blade 132 may be positioned both horizontally and vertically, and oriented relative to circle assembly 128. In some implementations, DCM 110 may include another work implement such as, for example, a ripper, a bucket, or another work implement.

As indicated above, FIG. 1 is provided as an example. Other examples may differ from what was described in connection with FIG. 1.

Figure 2:
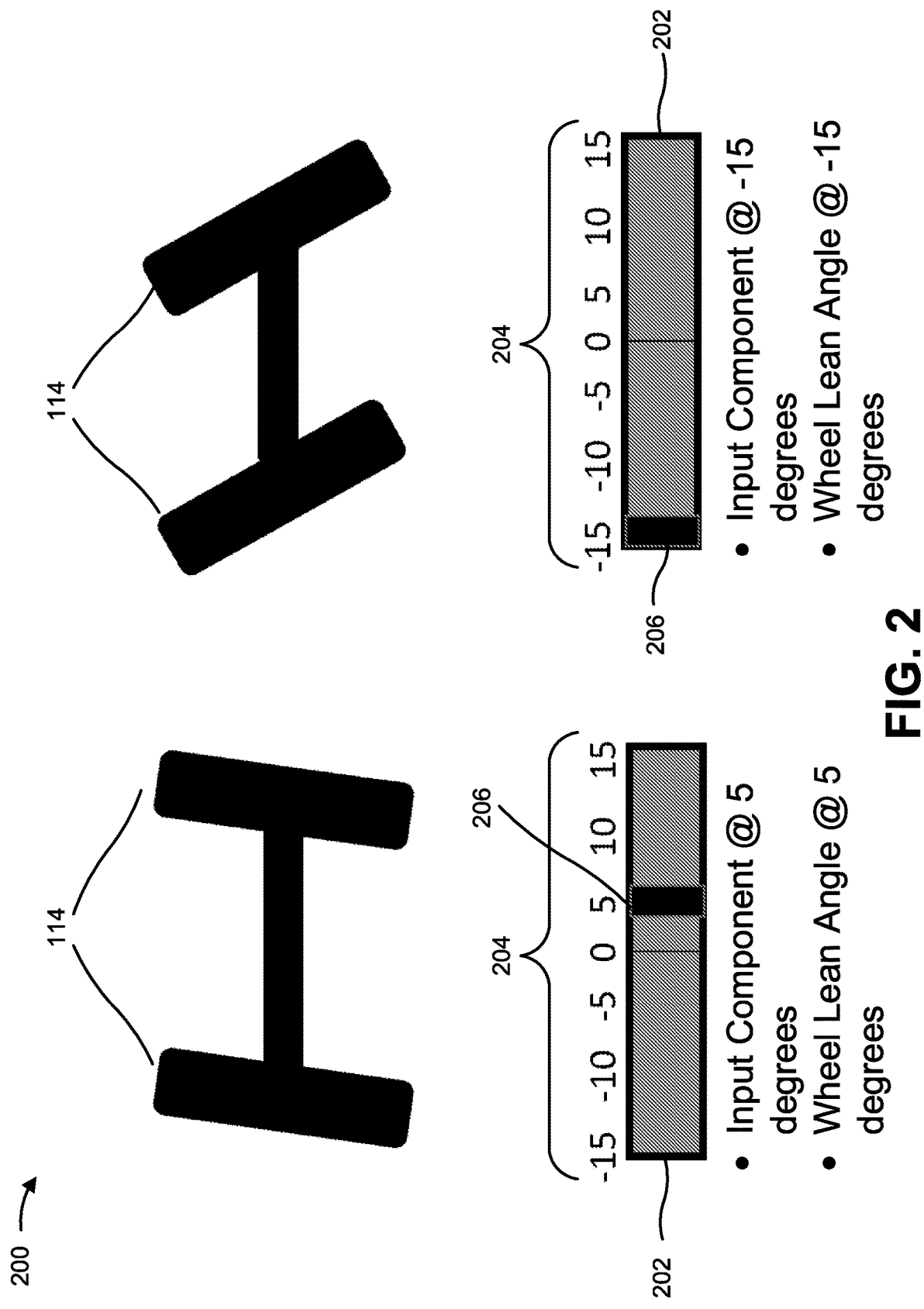
FIGS. 2-4 are diagrams of example input components of the control system that may be used with the work machine of FIG. 1.
Figure 3:
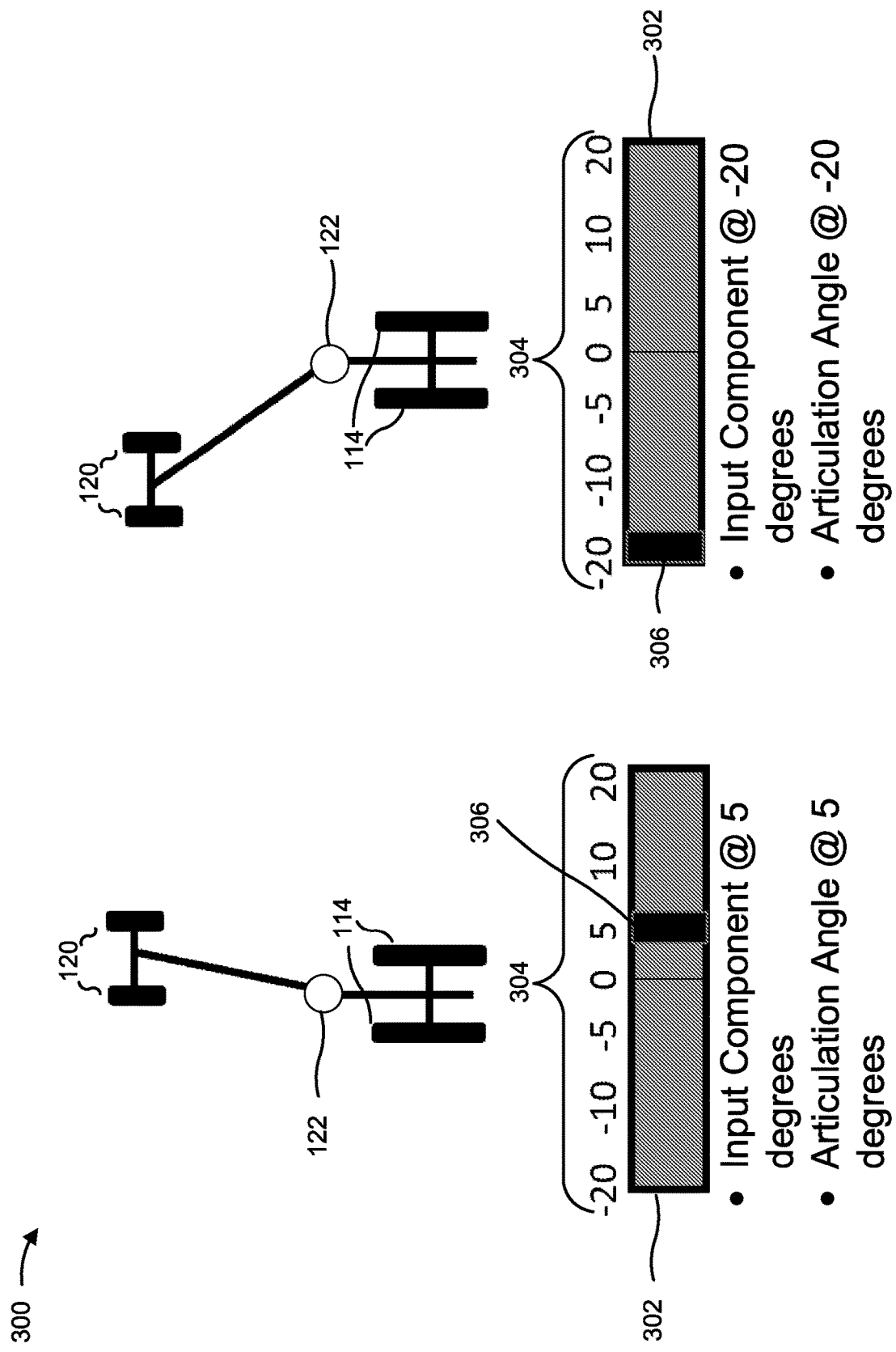
Figure 4:
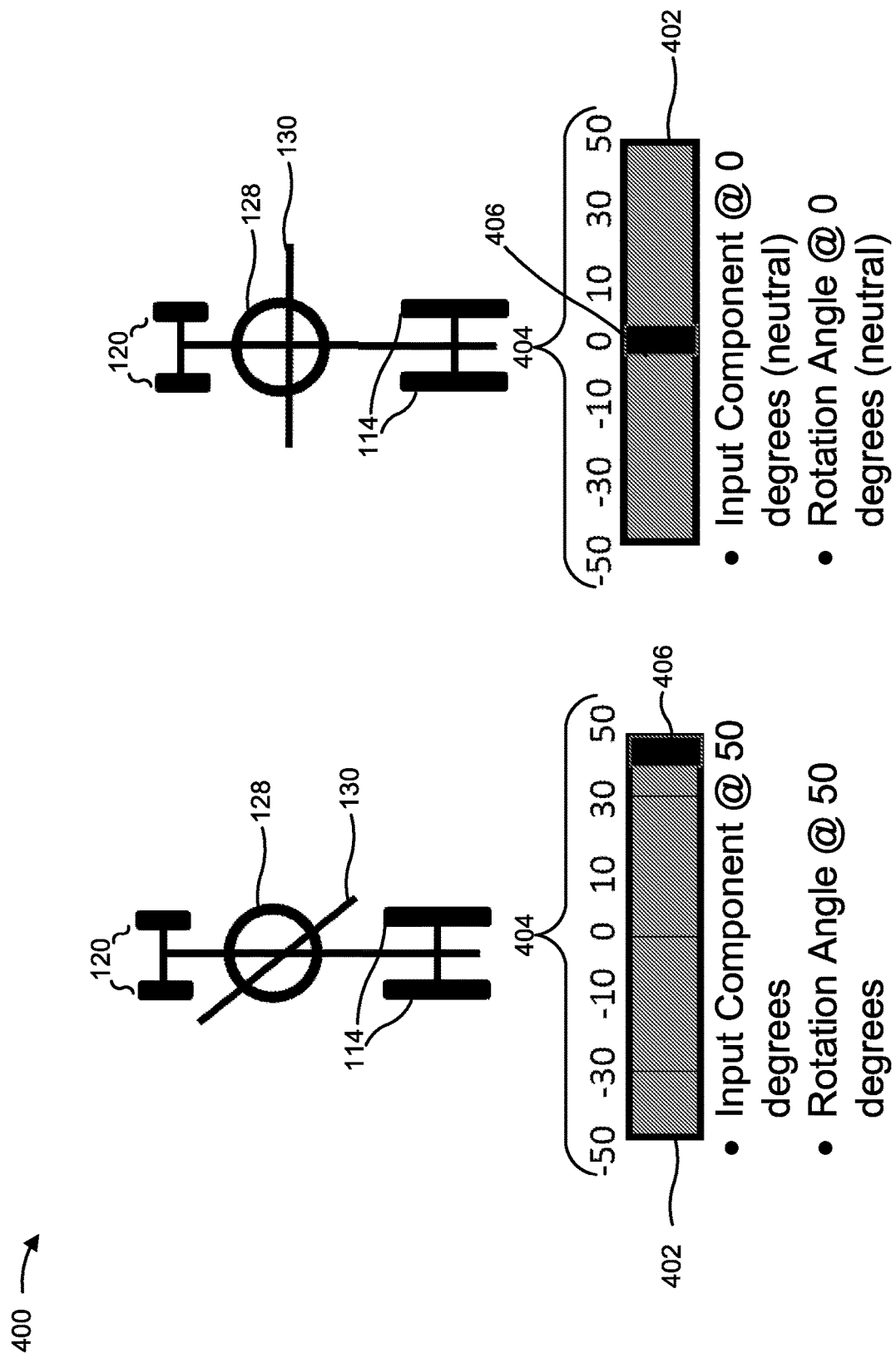

FIGS. 2-4 show example input components of control system 112 that may be used with work machine 100.

As shown in FIG. 2 and example implementation 200, control system 112 may include a first input component 202. First input component 202 may be a dial, a knob, a slider, a joystick, and/or the like. For example, first input component 202 is shown as a dial in FIG. 2 that includes a display element 204 (e.g., a guide, a key, a display, a meter, a marker, and/or the like) that indicates a displacement of a selector element 206 of first input component 202. An operator of first input component 202 may interact with (e.g., move, slide, roll, and/or the like) selector element 206 to choose the displacement of selector element 206. For example, as shown in FIG. 2, the operator may move selector element 206 to "5" degrees (e.g., the operator may move selector element 206 to the right past a "0" neutral position, as indicated by the display element 204), to indicate a positive 5 degrees displacement of selector element 206. As another example, as shown in FIG. 2, the operator may move selector element 206 to "−15" degrees (e.g., the operator may move selector element 206 to the left past the "0" neutral position) to indicate a negative 15 degrees displacement of selector element 206.

First input component 202 may control a lean angle of wheels 114 (e.g., relative to the plane through horizontal axis 118). For example, first input component 202 may control the lean angle to approximate, match, correspond to, and/or the like the displacement of selector element 206. To do so, first input component 202 may cause wheels 114 to lean (e.g., relative to the plane through horizontal axis 118) until the lean angle approximates, matches, corresponds to, and/or the like the displacement of selector element 206. Additionally, or alternatively, first input component 202 may send one or more signals to a controller (not shown) of control system 112. The one or more signals may indicate the displacement of selector element 206. The controller may receive the one or more signals and may cause, based on the one or more signals, wheels 114 to lean until the lean angle approximates, matches, corresponds to, and/or the like the displacement of selector element 206. As shown in FIG. 2, first input component 202 may control the lean angle within a range of −15 degrees and 15 degrees, but additional implementations contemplate different ranges.

First input component 202 may include one or more detent positions. A detent position may indicate a particular displacement of selector element 206, such as a neutral displacement (e.g., selector element 206 is at "0" degrees), a maximum displacement (e.g., selector element 206 is at "−15" or "15" degrees), and/or the like. The particular displacement of selector element 206 indicated by the detent position may correspond to a particular lean angle (e.g., the neutral displacement of selector element 206 corresponds to a neutral lean angle (e.g., wheels 114 are parallel with vertical axis 116), the maximum displacement of selector element 206 corresponds to a maximum lean angle (e.g., wheels 114 have a maximum lean angle supported by work machine 100), and/or the like). First input component 202 may cause the lean angle to approximate, match, correspond to, and/or the like, the particular displacement of selector element 206 when selector element 206 is in the detent position. Moreover, first input component 202 may provide tactile feedback (e.g. a vibration, a click, and/or the like) to an operator of first input component 202 when the operator moves selector element 206 to the detent position.

As shown in FIG. 3 and example implementation 300, control system 112 may include a second input component 302. Second input component 302 may be a dial, a knob, a slider, a joystick and/or the like, and may include a display element 304 (e.g., a guide, a key, a display, a meter, a marker, and/or the like) that indicates a displacement of a selector element 306 of second input component 302. An operator of second input component 302 may interact with (e.g., move, slide, roll, and/or the like) selector element 306 to choose the displacement of selector element 306. For example, as shown in FIG. 3, the operator may move selector element 306 to "5" degrees (e.g., the operator may move selector element 306 to the right past a "0" neutral position, as indicated by the display element 304), to indicate a positive 5 degrees displacement of selector element 306. As another example, as shown in FIG. 3, the operator may move selector element 306 to "−20" degrees (e.g., the operator may move selector element 306 to the left past the "0" neutral position) to indicate a negative 20 degrees displacement of selector element 306.

Second input component 302 may control the articulation angle of articulated joint 122. For example, second input component 302 may control the articulation angle to approximate, match, correspond to, and/or the like the displacement of selector element 306. To do so, second input component 302 may cause steerable traction device 102 and driven traction device 104 to articulate about articulated joint 122 until the articulated angle approximates, matches, corresponds to, and/or the like the displacement of selector element 306. Additionally, or alternatively, second input component 302 may send one or more signals to a controller (not shown) of control system 112. The one or more signals may indicate the displacement of selector element 306. The controller may receive the one or more signals and may cause, based on the one or more signals, steerable traction device 102 and driven traction device 104 to articulate about articulated joint 122 until the articulated angle approximates, matches, corresponds to, and/or the like the displacement of selector element 306. As shown in FIG. 3, second input component 302 may control the articulation angle within a range of −20 degrees and 20 degrees, but additional implementations contemplate different ranges.

Second input component 302 may include one or more detent positions. A detent position may indicate a particular displacement of selector element 306, such as a neutral displacement (e.g., selector element 306 is at "0" degrees), a maximum displacement (e.g., selector element 306 is at "−20" or "20" degrees), and/or the like. The particular displacement of selector element 306 indicated by the detent position may correspond to a particular articulation angle (e.g., the neutral displacement of selector element 306 corresponds to a neutral articulation angle (e.g., articulated joint 122 is at "0" degrees), the maximum displacement of selector element 306 corresponds to a maximum articulation angle (e.g., articulated joint 122 is at a maximum articulation angle supported by work machine 100), and/or the like). Second input component 302 may cause the articulation angle to approximate, match, correspond to, and/or the like, the particular displacement of selector element 306 when selector element 306 is in the detent position. Moreover, second input component 302 may provide tactile feedback (e.g. a vibration, a click, and/or the like) to an operator of second input component 302 when the operator moves selector element 306 to the detent position.

As shown in FIG. 4 and example implementation 400, control system 112 may include a third input component 402. Third input component 402 may be, a dial, a knob, a slider, a joystick, and/or the like, and may include a display element 404 (e.g., a guide, a key, a display, a meter, a marker, and/or the like) that indicates a displacement of a selector element 406 of third input component 402. An operator of third input component 402 may interact with (e.g., move, slide, roll, and/or the like) selector element 406 to choose the displacement of selector element 406. For example, as shown in FIG. 4, the operator may move selector element 406 to "50" degrees (e.g., the operator may move selector element 306 to the right past a "0" neutral position, as indicated by the display element 404), to indicate a positive 50 degrees displacement of selector element 406. As another example, as shown in FIG. 4, the operator may move selector element 406 to "0" degrees (e.g., the operator may move selector element 406 to the left to the "0" neutral position) to indicate a 0 degrees displacement of selector element 406.

Third input component 402 may control the rotation angle associated with an implement (e.g., DCM 110, drawbar assembly 124, circle assembly 128, and/or moldboard assembly 130). For example, third input component 402 may control the rotation angle to approximate, match, correspond to, and/or the like the displacement of selector element 406. To do so, third input component 402 may cause the implement to rotate (e.g., about an axis of rotation of the implement) until the rotation angle approximates, matches, corresponds to, and/or the like the displacement of selector element 406. Additionally, or alternatively, third input component 402 may send one or more signals to a controller (not shown) of control system 112. The one or more signals may indicate the displacement of selector element 406. The controller may receive the one or more signals and may cause, based on the one or more signals, the implement to rotate (e.g., about an axis of rotation of the implement) until the rotation angle approximates, matches, corresponds to, and/or the like the displacement of selector element 406. As shown in FIG. 4, third input component 402 may control the rotation angle within a range of −50 degrees and 50 degrees, but additional implementations contemplate different ranges.

Third input component 402 may include one or more detent positions. A detent position may indicate a particular displacement of selector element 406, such as a neutral displacement (e.g., selector element 406 is at "0" degrees), a maximum displacement (e.g., selector element 406 is at "−50" or "50" degrees), and/or the like. The particular displacement of selector element 406 indicated by the detent position may correspond to a particular rotation angle (e.g., the neutral displacement of selector element 406 corresponds to a neutral rotation angle (e.g., the implement is at a "0" degree rotation angle), the maximum displacement of selector element 406 corresponds to a maximum rotation angle (e.g., the implement is at a maximum rotation angle supported by work machine 100), and/or the like). Third input component 402 may cause the rotation angle to approximate, match, correspond to, and/or the like, the particular displacement of selector element 406 when selector element 406 is in the detent position. Moreover, third input component 402 may provide tactile feedback (e.g. a vibration, a click, and/or the like) to an operator of third input component 402 when the operator moves selector element 406 to the detent position.

As indicated above, FIGS. 2-4 are provided as examples. Other examples may differ from what was described in connection with FIGS. 2-4.

Figure 5:
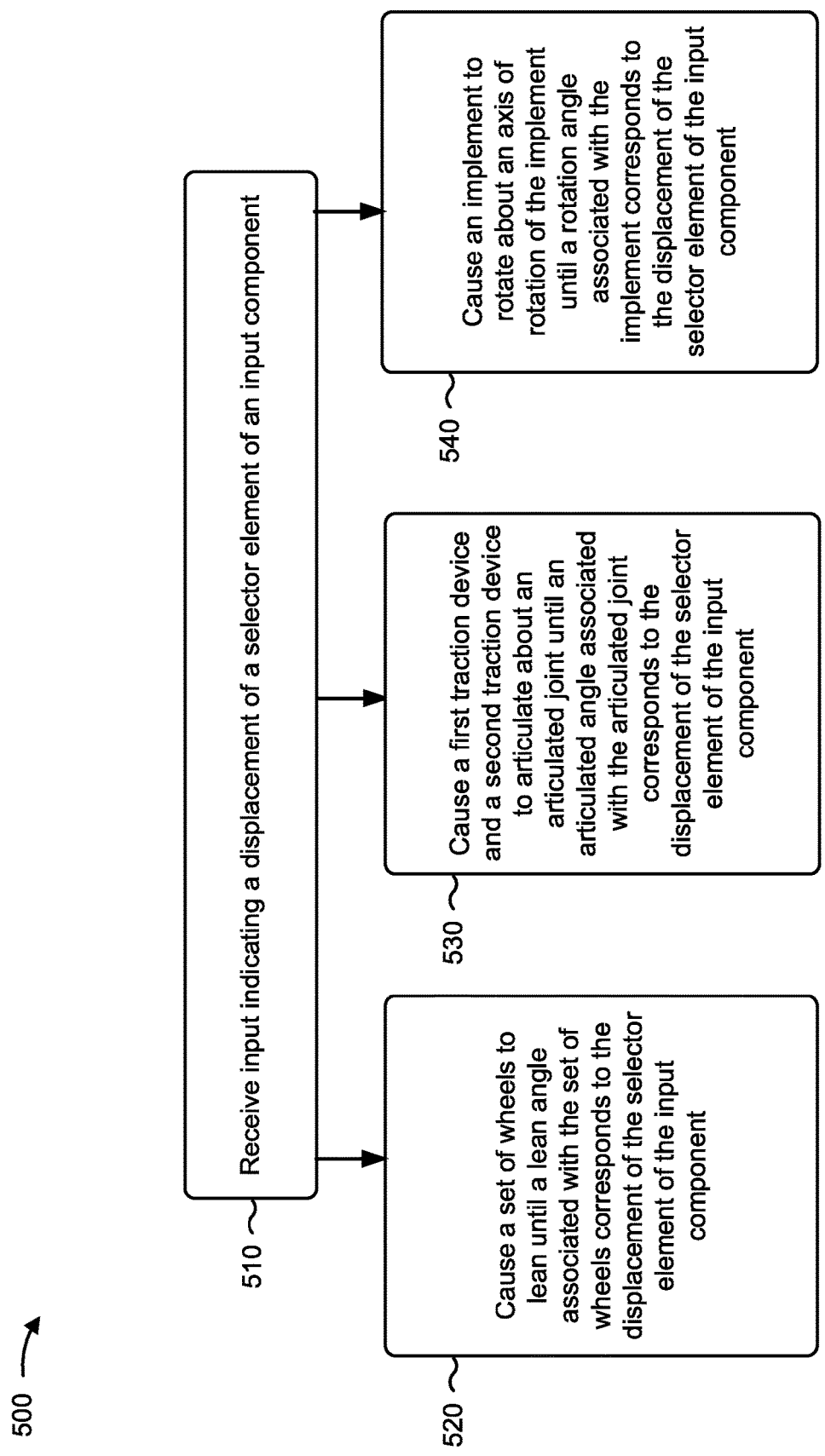
FIG. 5 is a diagram of an example process associated with a control system for a work machine.

FIG. 5 is a flow chart of an example process 500 associated with control system 112. In some implementations, one or more process blocks of FIG. 5 may be performed by an input component (e.g., first input component 202, second input component 302, third input component 402, and/or the like). In some implementations, one or more process blocks of FIG. 5 may be performed by another device or a group of devices separate from or including the input component, such as a controller of control system 112 and/or the like.

As shown in FIG. 5, process 500 may include receiving input indicating a displacement of a selector element of an input component (block 510). For example, the input component (e.g., using one or more processors, one or more memories, and/or the like) may receive input indicating a displacement of a selector element of an input component, as described above.

As further shown in FIG. 5, process 500 may include causing a set of wheels to lean until a lean angle associated with the set of wheels corresponds to the displacement of the selector element of the input component (block 520). For example, the input component (e.g., using one or more processors, one or more memories, and/or the like) may cause a set of wheels to lean until a lean angle associated with the set of wheels corresponds to the displacement of the selector element of the input component, as described above.

As further shown in FIG. 5, process 500 may include causing a first traction device and a second traction device to articulate about an articulated joint until an articulated angle associated with the articulated joint corresponds to the displacement of the selector element of the input component (block 530). For example, the input component (e.g., using one or more processors, one or more memories, and/or the like) may cause a first traction device and a second traction device to articulate about an articulated joint until an articulated angle associated with the articulated joint corresponds to the displacement of the selector element of the input component, as described above.

As further shown in FIG. 5, process 500 may include causing an implement to rotate about an axis of rotation of the implement until a rotation angle associated with the implement corresponds to the displacement of the selector element of the input component (block 540). For example, the input component (e.g., using one or more processors, one or more memories, and/or the like) may cause an implement to rotate about an axis of rotation of the implement until a rotation angle associated with the implement corresponds to the displacement of the selector element of the input component, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

In some instances, a work machine includes a control system to control one or more work elements of the work machine and/or properties associated with the one or more work elements. For example, the control system may control a lean angle of one or more wheels of the machine, an articulation angle of an articulated joint of the machine, a rotation angle of an implement of the machine, and/or the like. In many cases, the control system includes one or more input components. An operator may engage an input component of the control system to cause a work element to move, rotate, articulate, and/or the like in a particular direction, but the operator must continue to engage the input component to cause the work element to continue to move, rotate, articulate, and/or the like (e.g., the operator must continue to engage the input component to cause a flow of hydraulic fluid to one or more hydraulic devices that move, rotate, articulate, and/or the like the work element) to a desired position. Once the operator disengages the input component, the input component moves back to a default position and the work element stops moving, rotating, articulating, and/or the like (e.g., the flow of hydraulic fluid to the one or more hydraulic devices stops). Moreover, if the operator would like the work element to return to an original position, the operator must reengage the input component (but in an opposite manner) to cause the work element to move, rotate, articulate, and/or the like to the original position. As a result, the input component of the control system does not provide any indication of a position of the work element.

According to some implementations herein, a control system (e.g., control system 112) includes a first input component (e.g., first input component 202) to control a lean angle of at least one set of wheels (e.g., wheels 114) of a machine (e.g., work machine 100). The control system includes a second input component (e.g., second input component 302) to control an articulation angle of an articulated joint (e.g., articulated joint 122) of the machine. The control system includes a third input component (e.g., third input component 402) to control a rotation angle of an implement (e.g., DCM 110) of the machine.

Accordingly, an operator may engage a selector element of an input component of the control system to indicate a displacement of the selector element, which causes the input component to control an angle (e.g., a lean angle, an articulation angle, a rotation angle, and/or the like) of a work element (e.g., the at least one set of wheels, the articulated joint, the implement, and/or the like). Notably, after the operator sets the displacement of the selector element, the operator may disengage the selector element and the input component will automatically control the work element to move until the angle of the work element approximates, matches, corresponds to, and/or the like the displacement of the selector element (e.g., the input component causes a flow of hydraulic fluid to one or more hydraulic devices to move, rotate, articulate, and/or the like the work element until the angle of the work element matches the displacement of the selector element). This allows the operator to focus on other tasks while the input component causes the work element to move, rotate, articulate, and/or the like, which may result in more efficient operation of the machine.

Furthermore, the input component provides a visual indication of displacement of the angle of the work element (e.g., the operator can look at the input component, the selector element, and/or a display element of the input component to determine the angle of the work element). Additionally, the input component provides a tactile indication of the angle of the work element (e.g., the operator can place a hand on the input component, the selector element, and/or a display element of the input component to feel a position of the selector element to determine the angle of the work element, the operator can feel when the selector element moves to a detent position of the input component, and/or the like). The visual and/or tactile indication of the angle of the work element may allow the operator to focus solely on the input component when engaging the selector element. This may result in more efficient operation of the work machine (e.g., the operator may be able to focus on a desired angle of the work element without having to divide the operator's attention between a display gauge and the input component).

What is claimed is:

1. A motor grader comprising:
a steerable traction device operatively connected to a first set of wheels;
a driven traction device operatively connected to a second set of wheels;
a frame having an articulated joint connecting the steerable traction device to the driven traction device;
an implement operatively connected to the frame; and
a control system including a joystick, the control system configured to:
control, based on a displacement associated with the joystick and after an operator disengages the joystick, one or more of a lean angle of the first set of wheels, an articulation angle of the articulated joint, and/or a rotation angle of the implement; and
cause a tactile indication via the joystick after one or more of:
the lean angle of the first set of wheels matching the displacement associated with the joystick,
the articulation angle of the articulated joint matching the displacement associated with the joystick, and/or
the rotation angle of the implement matching the displacement associated with the joystick,
wherein the tactile indication includes a vibration.

2. The motor grader of claim 1, wherein the control system is a closed loop control system.

3. The motor grader of claim 1, wherein the implement is a drawbar-circle-moldboard assembly (DCM), a ripper, or a bucket.

4. The motor grader of claim 1, wherein the joystick is configured to control the lean angle of the first set of wheels.

5. The motor grader of claim 1, wherein, to control one or more of the lean angle of the first set of wheels, the articulation angle of the articulated joint, and/or the rotation angle of the implement, the control system is configured to:
move the first set of wheels until the lean angle of the first set of wheels matches the displacement associated with the joystick.

6. The motor grader of claim 1, wherein, to control one or more of the lean angle of the first set of wheels, the articulation angle of the articulated joint, and/or the rotation angle of the implement, the control system is configured to:
control the implement.

7. The motor grader of claim 1, wherein, to control one or more of the lean angle of the first set of wheels, the articulation angle of the articulated joint, and/or the rotation angle of the implement, the control system is configured to:
control the articulation angle of the articulated joint.

8. The motor grader of claim 1, wherein, to cause the tactile indication, the control system is configured to:
cause the vibration via the joystick based on the rotation angle of the implement matching the displacement associated with the joystick.

9. The motor grader of claim 1, wherein, to cause the tactile indication, the control system is configured to:
cause the vibration via the joystick based on the articulation angle of the articulated joint matching the displacement associated with the joystick.

10. The motor grader of claim 1, wherein, to cause the tactile indication, the control system is configured to:
cause the vibration via the joystick based on the lean angle of the first set of wheels matching the displacement associated with the joystick.

11. A control system for a motor grader, comprising:
a joystick; and
one or more processors associated with the joystick, configured to:
control an angle of a work element of the motor grader based on a displacement associated with the joystick and after an operator disengages the joystick,
wherein the angle of the work element includes at least one of:
a lean angle of a set of wheels,
an articulation angle of an articulated joint, and/or
a rotation angle of an implement; and
cause a tactile indication via the joystick after the angle of the work element matches the displacement associated with the joystick,
wherein the tactile indication includes a vibration.

12. The control system of claim 11, wherein the one or more processors are further configured to:
cause a visual indication corresponding to the angle of the work element,
wherein the visual indication is numerical.

13. A machine comprising:
a control system including a joystick, the control system configured to:
control, based on a displacement associated with the joystick and after an operator disengages the joystick, one or more of a lean angle of a set of wheels, an articulation angle of an articulated joint, and/or a rotation angle of an implement; and
cause a tactile indication via the joystick after one or more of:
the lean angle of the set of wheels matching the displacement associated with the joystick,
the articulation angle of the articulated joint matching the displacement associated with the joystick, and/or
the rotation angle of the implement matching the displacement associated with the joystick,
wherein the tactile indication includes a vibration.

14. The machine of claim 13, where, to control one or more of the lean angle of the set of wheels, the articulation angle of the articulated joint, and/or the rotation angle of the implement, the control system is configured to:
control, based on the displacement associated with the joystick, the lean angle of the set of wheels.

15. The machine of claim 13, where, to control one or more of the lean angle of the set of wheels, the articulation angle of the articulated joint, and/or the rotation angle of the implement, the control system is configured to:
control, based on the displacement associated with the joystick, the articulation angle of the articulated joint.

16. The machine of claim 13, where, to control one or more of the lean angle of the set of wheels, the articulation angle of the articulated joint, and/or the rotation angle of the implement, the control system is configured to:
control, based on the displacement associated with the joystick, the rotation angle of the implement.

17. The machine of claim 13, where, to cause the tactile indication, the control system is configured to:
cause the vibration via the joystick based on one or more of:
the lean angle of the set of wheels matching the displacement associated with the joystick, and/or the articulation angle of the articulated joint matching the displacement associated with the joystick.

18. The machine of claim 17, where, to cause the vibration, the control system is configured to:
cause the vibration via the joystick based on the lean angle of the set of wheels matching the displacement associated with the joystick.

19. The machine of claim 17, where, to cause the vibration, the control system is configured to:
cause the vibration via the joystick based on the articulation angle of the articulated joint matching the displacement associated with the joystick.

20. The machine of claim 13, where, to cause the tactile indication, the control system is configured to:
cause the vibration via the joystick based on the rotation angle of the implement matching the displacement associated with the joystick.

\* \* \* \* \*